(12) United States Patent
Stalker et al.

(10) Patent No.: US 7,681,028 B2
(45) Date of Patent: *Mar. 16, 2010

(54) PROACTIVE REBOOTING IN A SET-TOP TERMINAL AND CORRESPONDING METHODS

(75) Inventors: Altan J. Stalker, Lawrenceville, GA (US); Stephen K. Necessary, Alpharetta, GA (US)

(73) Assignee: Scientific-Atlanta, LLC, Lawrenceville, GA (US)

( * ) Notice: Subject to any disclaimer, the term of this patent is extended or adjusted under 35 U.S.C. 154(b) by 637 days.

This patent is subject to a terminal disclaimer.

(21) Appl. No.: 11/556,277

(22) Filed: Nov. 3, 2006

(65) Prior Publication Data

US 2007/0061615 A1    Mar. 15, 2007

Related U.S. Application Data

(63) Continuation of application No. 10/317,879, filed on Dec. 12, 2002, now Pat. No. 7,149,889.

(51) Int. Cl.
*G06F 15/177* (2006.01)
*G06F 9/445* (2006.01)
*G06F 9/00* (2006.01)
*G06F 1/24* (2006.01)

(52) U.S. Cl. .............................. 713/2; 713/1; 713/100; 714/23

(58) Field of Classification Search ............... 713/1, 713/2, 100; 714/23
See application file for complete search history.

(56) References Cited

U.S. PATENT DOCUMENTS

| | | | | |
|---|---|---|---|---|
| 6,115,824 | A | 9/2000 | Ha | 713/330 |
| 6,393,585 | B1 * | 5/2002 | Houha et al. | 714/23 |
| 6,718,374 | B1 * | 4/2004 | Del Sordo et al. | 709/220 |
| 6,820,215 | B2 | 11/2004 | Harper et al. | 714/15 |
| 7,149,889 | B2 * | 12/2006 | Stalker et al. | 713/2 |
| 2003/0074604 | A1 | 4/2003 | Mathias et al. | 714/38 |
| 2003/0079026 | A1 | 4/2003 | Watanabe et al. | 709/228 |
| 2003/0149506 | A1 | 8/2003 | Haanstra et al. | 700/121 |
| 2004/0078539 | A1 * | 4/2004 | Fulghum | 711/170 |
| 2004/0117609 | A1 | 6/2004 | Stalker et al. | 713/2 |

OTHER PUBLICATIONS

Peer-to-peer wikipedia, (cited in 10/317879).

* cited by examiner

*Primary Examiner*—Chun Cao
*Assistant Examiner*—Fahmida Rahman
(74) *Attorney, Agent, or Firm*—Merchant & Gould

(57) ABSTRACT

A set-top terminal and related methods is provided that, in one embodiment, comprises a memory with proactive reboot logic and a processor configured with the proactive reboot logic to detect an indication of a critical condition associated with the set-top terminal, determine based on a current status of resources in the set-top terminal if a current time provides an opportunity for a reboot of the set-top terminal in a manner that reduces user intrusiveness, and effect a rebooting of the set-top terminal if the current time provides the opportunity, otherwise postponing the reboot.

16 Claims, 9 Drawing Sheets

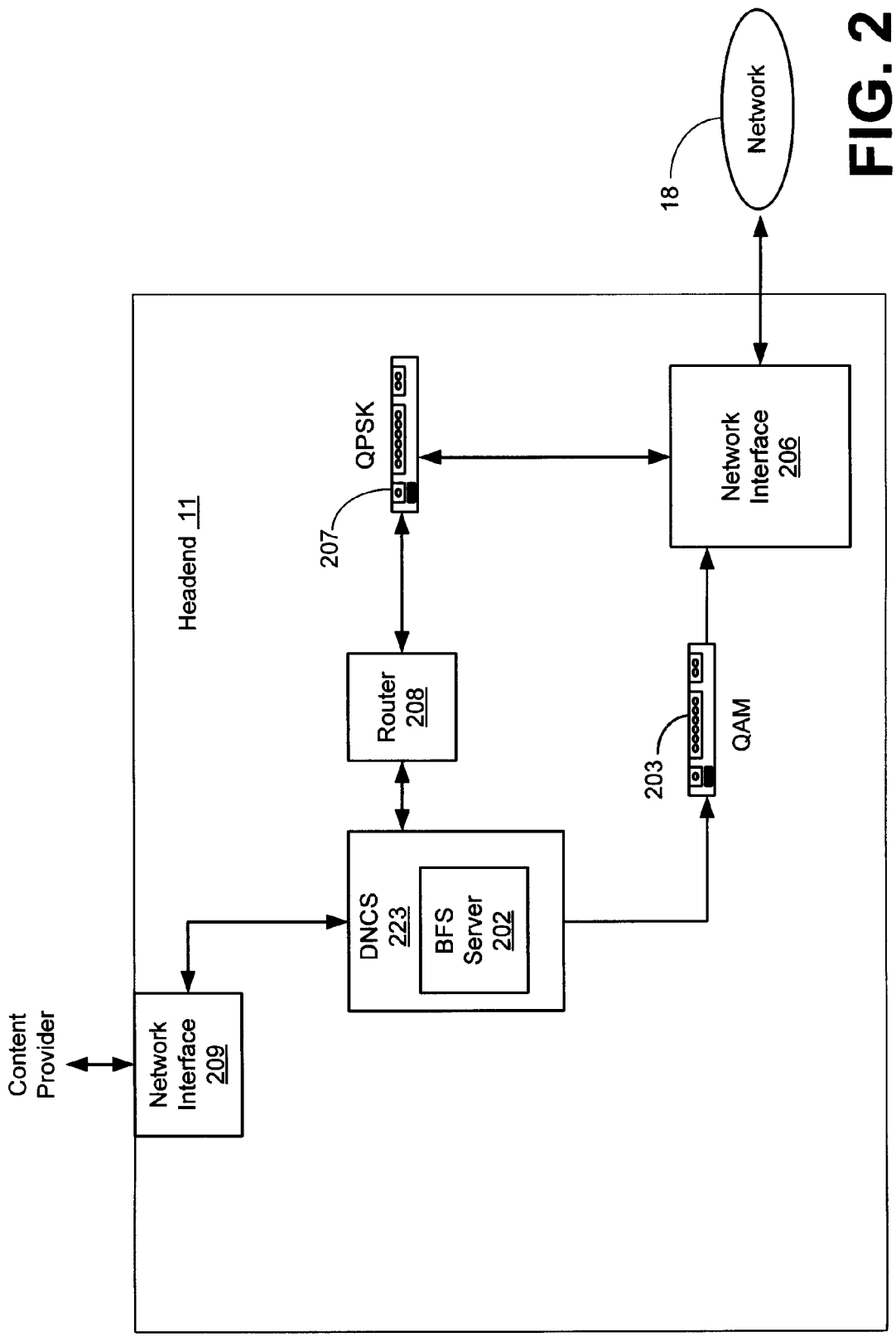

FIG. 5C

MAINTENANCE

Set-top services need to be temporarily interrupted for maintenance. To perform maintenance at a later time, press the "C" key. Otherwise, maintenance will be performed shortly.

Ⓒ POSTPONE — 582

580

PROACTIVE REBOOTING IN A SET-TOP TERMINAL AND CORRESPONDING METHODS

CROSS-REFERENCE TO RELATED APPLICATION

This application is a continuation of U.S. utility application entitled, "PROACTIVE REBOOT," having Ser. No. 10/317,879, issued as U.S Pat. No. 7,149,889 filed Dec. 12, 2002, which is entirely incorporated herein by reference.

TECHNICAL FIELD

The present invention is generally related to television systems, and, more particularly, is related to rebooting operations in television systems.

BACKGROUND OF THE INVENTION

With recent advances in digital transmission technology, subscriber television systems are now capable of providing much more than the traditional analog broadcast video. In implementing enhanced programming, the home communication terminal ("HCT"), otherwise known as the set-top box, has become an important computing device for accessing content services (and content within those services) and navigating a user through a maze of available services. In addition to supporting traditional analog broadcast video functionality, digital HCTs (or "DHCTs") now also support an increasing number of two-way digital services such as video-on-demand and personal video recording.

Typically, a DHCT is connected to a cable or satellite, or generally, a subscriber television system, and includes hardware and software necessary to provide the functionality of the digital television system at the user's site. Each DHCT also typically includes a processor, an operating system, communication components, and memory, and is connected to a television set or other display device, such as a personal computer.

Some of the software executed by a DHCT can be downloaded and/or updated via the subscriber television system. While running the software, sometimes software glitches or other operating problems occur. One mechanism typically employed to remedy these problems includes the process of resetting, or rebooting. However, routinely rebooting a DHCT is often viewed negatively because it may fail to remedy the underlying problem and/or it often degrades the user experience. Thus, a need exists in the industry to address the aforementioned and/or other deficiencies and/or inadequacies.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a block diagram of an example headend as depicted in FIG. 1 and related equipment, in accordance with one embodiment of the invention.

FIG. 5C is an example dialog box that provides a user with the ability to postpone a reboot, in accordance with one embodiment of the invention.

DETAILED DESCRIPTION OF THE PREFERRED EMBODIMENTS

Figure 1:
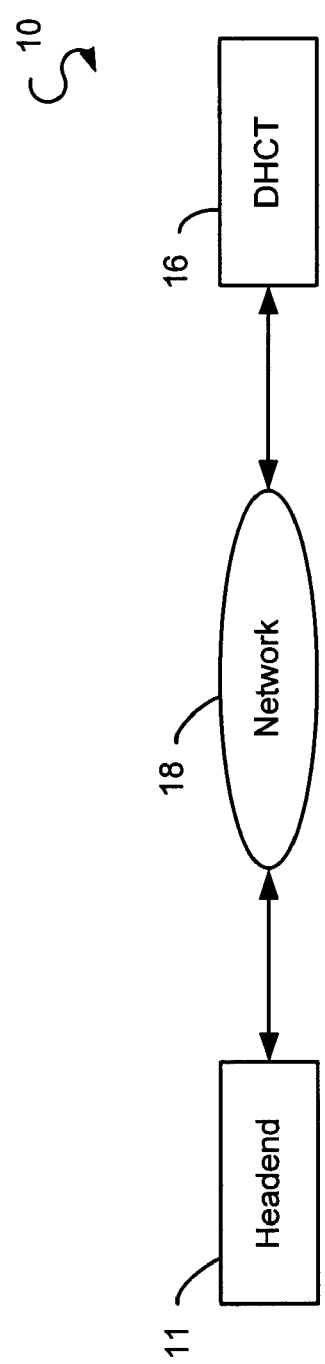
FIG. 1 is a block diagram of an example subscriber television system (STS), in accordance with one embodiment of the invention.

The preferred embodiments of the invention now will be described more fully hereinafter with reference to the accompanying drawings, in which preferred embodiments of the invention are shown. One way of understanding the preferred embodiments of the invention includes viewing them within the context of a subscriber television system, and more particularly within the context of a client device, such as a digital home communication terminal (DHCT), that includes an operating system that handles a variety of tasks to enable a user to enjoy a plurality of services, including email, web-browser, and TV services, among others. Although other communication environments and systems are considered to be within the scope of the preferred embodiments, the preferred embodiments of the invention will be described in the context of a DHCT that receives content from a headend over a subscriber television network as one example implementation among many.

Because the preferred embodiments of the invention can be understood in the context of a subscriber television system, an initial description of a subscriber television system is followed with further description of the headend and DHCT that are included within the subscriber television system. The preferred embodiments of the invention include, among other things, a proactive reboot system. The proactive reboot system includes mechanisms to proactively reboot the DHCT at an opportune time when it believes the DHCT will encounter an event (herein described as a critical problem) that, if left unaddressed, will cause an immediate, or forced, reboot that can interrupt the user experience. In some implementations, an unaddressed critical problem may not necessarily cause a forced, or immediate, reboot, but may cause deterioration of system performance. Thus, a proactive reboot includes a reboot that is implemented before the critical problem actually occurs. Rebooting will herein include restarting and/or reinitializing, preferably under software control, one or more components of the DHCT. Rebooting can thus include cycling of power off and then back on, as well as other mechanisms of rebooting (such as warm rebooting as that term is known in the art), to one or more components, which may result in the clearing of all or part of the contents in DHCT volatile memory.

Because the critical problem is only expected to occur, and has not yet occurred (and may not occur in some circumstances), the proactive reboot system can wait for an opportune time to reboot the DHCT. An opportune time preferably includes a time that the reboot will be least (or less, in some implementations) intrusive for a user. This provides, among other benefits, an improved user experience compared to immediate rebooting. The proactive reboot system is based at least in part on the assumption that critical problems, such as an application being unable to allocate memory resulting, for example, from extreme fragmentation, are preceded by conditions that are measurable. The measuring of these conditions is preferably performed by one or more condition monitors, which raise flags in response to a condition likely to cause a critical problem. The proactive reboot system preferably includes a proactive reboot manager (PRM) and an opportunity helper (OH). The PRM watches for flags raised by the condition monitors, and communicates with the OH to determine when to reboot without degrading (at least to an acceptable degree) the user experience (i.e., at an opportune time).

The balance of the figures described herein are used to illustrate the operations of the proactive reboot system. A timing diagram is used after the description of the DHCT and the headend to illustrate the various interactions between DHCT components to implement a proactive reboot system, in accordance with one embodiment of the invention. Accompanying figures are used to illustrate additional processing of the proactive reboot system, including an example flowchart that illustrates one example mechanism used by the proactive reboot system to determine an opportune time to reboot. Another figure that accompanies the timing diagram includes a user interface that can be used by the proactive reboot system to elicit information from the user as to what he or she considers to be an opportune time.

The preferred embodiments of the invention may, however, be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and are provided as an exemplary list among many other examples contemplated but not shown.

FIG. 1 is a block diagram depicting a non-limiting example of a subscriber television system (STS) 10. In this example, the STS 10 includes a headend 11 and a digital home communication terminal (DHCT) 16 that are coupled via a communications network 18. It will be appreciated that the STS 10 shown in FIG. 1 is merely illustrative and should not be construed as implying any limitations upon the scope of the preferred embodiments of the invention. For example, although single components (e.g., a headend and a DHCT) are illustrated in FIG. 1, the STS 10 can feature a plurality of any one of the illustrated components, or may be configured with alternative embodiments for any one of the individual components or with yet other additional components not enumerated above. Subscriber television systems also included within the scope of the preferred embodiments of the invention include systems not utilizing physical structured cabling for transmission, such as, but not limited to, satellite systems.

A DHCT 16 is typically situated at the residence or place of business of a user and may be a stand-alone unit or integrated into another device such as, for example, a television set or a personal computer or other display devices, or an audio device. The DHCT 16 receives signals (video, audio and/or other data) from the headend 11 through the network 18, and provides reverse information to the headend 11 through the network 18.

The headend 11 preferably receives content (e.g., movies, TV shows, music, web pages, data, etc.) from a content provider (not shown). The headend 11 may include one or more server devices (not shown) for providing video, audio, and/or data to client devices such as the DHCT 16. The headend 11 and the DHCT 16 cooperate to provide a user with television services via the television set (not shown). The television services may include, for example, broadcast television services, cable television services, premium television services, video-on-demand (VOD) services, and/or pay-per-view (PPV) services, among others.

FIG. 2 depicts a non-limiting example of selected components of a headend 11 that is configured in accordance with one embodiment of the present invention. It will be understood that the headend 11 shown in FIG. 2 is merely illustrative and should not be construed as implying any limitations upon the scope of the preferred embodiments of the invention. The headend 11 receives content from a variety of service and content providers (not shown), which can provide input in a variety of ways. The headend 11 combines the content from the various sources and distributes the content to subscribers via the distribution systems of the network 18. The input signals may be transmitted from sources to the headend 11 via a variety of transmission paths, including satellites (not shown) and terrestrial broadcast transmitters and antennas (not shown).

A digital network control system (DNCS) 223 provides management, monitoring, and control of network elements and of the broadcast services provided to users. A content provider transmits content for television services through a network interface 209 to the DNCS 223 of the headend 11. Such provider content, as well as applications and/or application executables stored at the headend 11, are preferably transmitted to the DHCT 16 (FIG. 1) using a broadcast file system (BFS) server 202. The BFS server 202 and its counterpart, a BFS client module 343 (FIG. 3B), are part of a file broadcasting system. The BFS server 202 repeatedly sends content through a network interface 206 to the DHCT 16 via a quadrature amplitude modulation (QAM) modem 203 over a period of time in a cyclical manner so that the DHCT 16 may access the content as needed. Content such as applications and other data are transmitted in a data carousel originating from the BFS server 202. For example, following a reboot, the DHCT 16 can replenish the applications lost from volatile memory during a reboot by retrieving, as needed, applications associated with user-requested services from this data carousel.

A quadrature phase shift keying (QPSK) modem 207 is responsible for transporting the out of band IP (Internet protocol) datagram traffic between the distribution headend 11 and a DHCT 16. Data transmitted or received by the QPSK modem 207 may be routed by a headend router 208. The headend router 208 may be used to deliver upstream data to the BFS server 202 and/or other various server applications (not shown).

Figure 3A:
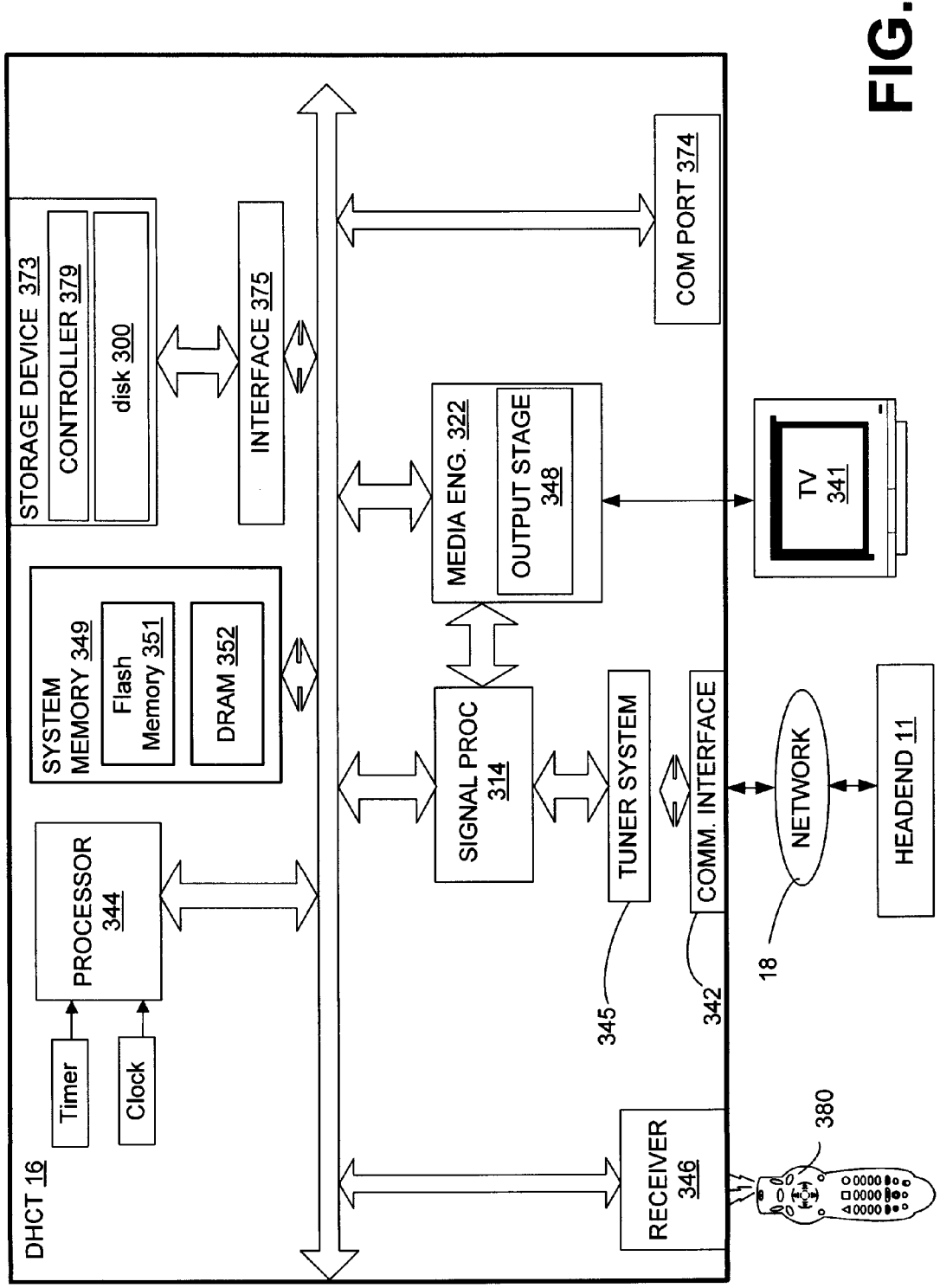
FIG. 3A is a block diagram of an example digital home communication terminal (DHCT) as depicted in FIG. 1 and related equipment, in accordance with one embodiment of the invention.

FIG. 3A is a block diagram illustration of an example DHCT 16 that is coupled to the headend 11 and to a television set 341, in accordance with one embodiment of the invention. It will be understood that the DHCT 16 shown in FIG. 3A is merely illustrative and should not be construed as implying any limitations upon the scope of the preferred embodiments of the invention. For example, some of the functionality performed by applications executed in the DHCT 16 may instead be performed completely or in part at the headend 11 and vice versa, or not at all in some embodiments. The DHCT 16 preferably includes a communications interface 342 for receiving signals (video, audio and/or other data) from the headend 11 through the network 18, and provides reverse information to the headend 11 through the network 18.

The DHCT 16 preferably includes one or more processors, such as processor 344, for controlling operations of the DHCT 16, an output system 348 for driving the television display 341, and a tuner system 345 for tuning into a particular television channel or frequency to present content and for sending and receiving various types of content to and from the headend 11. The DHCT 16 may include, in other embodiments, multiple tuners for receiving downloaded (or transmitted) content. The tuner system 345 enables the DHCT 16 to tune to downstream content transmissions, thereby allowing a user to receive digital and/or analog content delivered in the downstream transmission via the subscriber television system 10 (FIG. 1). The tuner system 345 includes, in one implementation, an out-of-band tuner for bi-directional QPSK data communication and one or more QAM tuners (in band) for receiving television signals. Additionally, a receiver 346 receives externally generated information, such as user inputs or commands from an input device, such as remote control device 380, or other devices.

The DHCT 16 processes analog and/or digital transmission signals for storage in the storage device 373, and/or for presentation at the television set 341. The DHCT 16 preferably includes a signal processing system 314 and a media engine 322. The components of the signal processing system 314 are capable of QAM demodulation, forward error correction, and demultiplexing of MPEG-2 transport streams, and parsing of elementary streams and packetized elementary streams. Additional components, not shown, include an analog decoder and compression engine for processing an analog transmission signal and, in one implementation, converting it to compressed audio and video streams that are produced in accordance with the syntax and semantics of a designated audio and video coding method, such as that specified by the MPEG-2 audio and MPEG-2 video ISO (International Organization for Standardization or ISO) standard.

The signal processing system 314 outputs packetized compressed streams and presents them as input for storage in the storage device 373 via an interface 375, or in other implementations, as input to the media engine 322 for decompression by a video decompression engine (not shown) and an audio decompression engine (not shown) for display on the TV set 341 via an output stage 348. One having ordinary skill in the art will appreciate that the signal processing system 314 will preferably include other components not shown, including memory, decryptors, samplers, digitizers (e.g., analog-to-digital converters), and multiplexers, among other components. Further, it will be understood that one or more of the components listed above will interface with the processor 344 and/or system memory 349 (and/or dedicated memory for a particular component) to facilitate data transfer and/or processing of the video and/or audio signal for display and/or storage.

The DHCT 16 can also include one or more wireless or wired interfaces, also called communication ports 374, for receiving and/or transmitting data to other devices. For instance, the DHCT 16 may feature USB (Universal Serial Bus), Ethernet (for connection to a computer), IEEE-1394 (for connection to content devices in an entertainment center), serial, and/or parallel ports, among others.

The DHCT 16 includes at least one storage device 373 to provide storage for downloaded content. The storage device 373 can be an optical storage device or a magnetic storage device, among others, and is preferably a hard disk drive. The storage device 373 comprises storage for content that can be written to for storage and later read from for retrieval for presentation or other processing. The storage device 373 preferably includes at least one hard disk 300. The storage device 373 is also comprised of a controller 379 that preferably receives operating instructions from a device driver 311 (FIG. 3B) of an operating system 353 (FIG. 3B) and implements those instructions to cause read and/or write operations to the hard disk 300. The storage device 373 is preferably internal to the DHCT 16, coupled to a common bus through a communication interface 375, preferably an integrated drive electronics (IDE) interface or small computer system interface (SCSI), although IEEE-1394 or USB can be used. In other embodiments, the storage device 373 can be externally connected to (and thus removable from) the DHCT 16 via a communication port 374 implemented as IEEE-1394 or USB or as a data interface port such as a SCSI or an IDE interface.

Figure 3B:
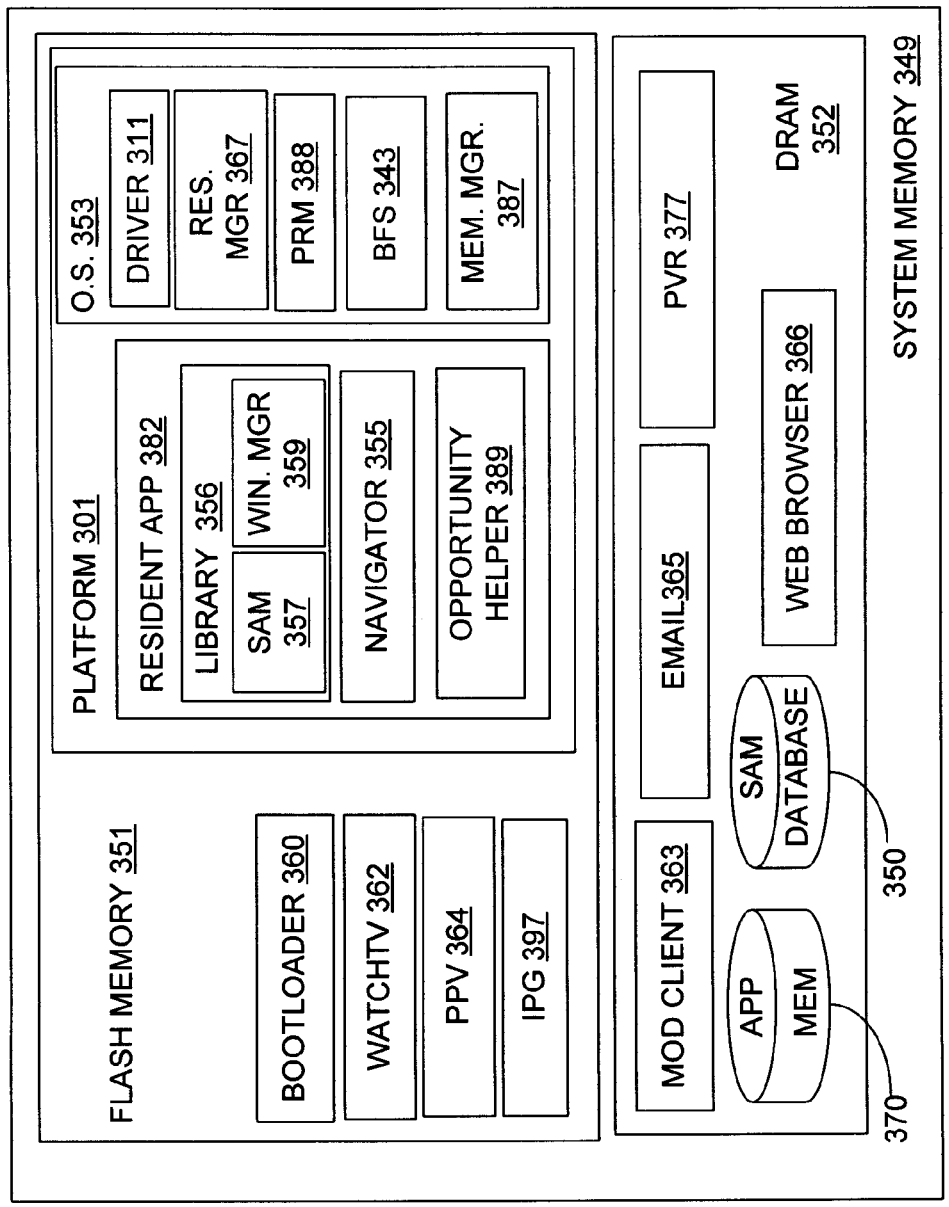
FIG. 3B is a block diagram of an example system memory configuration as depicted in FIG. 3A, in accordance with one embodiment of the invention.

FIG. 3B shows one example system memory configuration, in accordance with one embodiment of the invention. FLASH 351 preferably includes an operating system 353 and a resident application 382 (the operating system 353 and the resident application 382 collectively referred to as a platform 301), and a few example applications. The platform 301 preferably includes all functionality that the applications can use, including the operating system 353 and the resident application 382. One or more programmed software applications are executed by utilizing the computing resources in the DHCT 16. Note that an application typically includes a client part and a server counterpart that cooperate to provide the complete functionality of the application. The applications may be resident in FLASH memory 351 or downloaded (or uploaded) into DRAM 352. Applications stored in FLASH memory 351 or DRAM 352 are executed by the processor 344 (e.g., a central processing unit or digital signal processor) under the auspices of the operating system 353. Data required as input by an application is stored in DRAM 352 or FLASH memory 351 and read by the processor 344 as need be during the course of application execution. Input data may be data stored in DRAM 352 by a secondary application or other source, either internal or external to the DHCT 16, or possibly anticipated by the application and thus created with the application at the time it was generated as a software application, in which case it is stored in FLASH memory 351. Data generated by an application is stored in DRAM 352 by the processor 344 during the course of application execution. DRAM 352 also includes application memory 370 that various applications may use for storing and/or retrieving data.

The resident application 382 is one component of the platform 301 that includes shared functionality. The resident application 382 provides service management, settings, and user interface functionality usable by applications located in FLASH 351 or DRAM 352. This shared functionality can be used to provide insight for the proactive reboot system to determine such status conditions as the state of the box (e.g., powered on, powered off), among other functions. For example, through a SAM client 357, the resident application 382 knows whether an application is active (e.g., in use by a user) or inactive (e.g., not in use by a user). As another example, through user interface functionality, the resident application 382 can determine a user-preferred time of day for system maintenance. The resident application 382 is preferably a level on top of the operating system 353 that provides a functional interface between the applications and the operating system 353. The resident application 382 includes a navigator 355 and a platform library 356 with its associated modules.

The navigator 355 provides a navigation framework for services provided by the DHCT 16. The navigator 355 registers for and in some cases reserves certain user inputs related to navigational keys such as channel increment/decrement, last channel, favorite channel, etc. The navigator 355 also provides users with television related menu options that correspond to DHCT functions such as, for example, blocking a channel or a group of channels from being displayed in a channel menu presented on a screen display.

The platform library 356 is a collection of utilities useful to applications, such as a timer manager, a compression manager, a configuration manager, a hypertext markup language (HTML) parser, a database manager, a widget toolkit, a string manager, and other utilities (not shown). These utilities are accessed by applications via application programming interfaces (APIs) as necessary so that each application does not have to contain these utilities. Two components of the platform library 356 that are shown in FIG. 3B are a window manager 359 and a service application manager (SAM) client 357. Note that in other embodiments, one or more of these modules may be located in the operating system 353. The window manager 359 provides a mechanism for implementing the sharing of the screen regions and user input. The window manager 359 on the DHCT 16 is responsible for, as directed by one or more applications, implementing the creation, display, and de-allocation of the limited DHCT screen resources. It allows multiple applications to share the screen by assigning ownership of screen regions, or windows. The window manager 359 communicates with the resource manager 367 to coordinate available resources (such as display memory) among different resource consuming processes. Such processes may be directly or indirectly invoked by one or more applications. The SAM client 357 is a client component of a client-server pair of components, with the server component (not shown) being located on the headend 11, preferably in the DNCS 223 (FIG. 2). A SAM database 350 (i.e., structured data such as a database or data structure) in DRAM 352 includes a data structure of services and a data structure of channels that are created and updated by the headend 11. Herein, database will refer to a database, structured data or other data structures as is well known to those of ordinary skill in the art.

Applications can also be downloaded into DRAM 352 at the request of the SAM client 357, typically in response to a request by the user or in response to a message from the headend 11. In the example DHCT system memory 349 illustrated in FIG. 3B, DRAM 352 includes a media-on-demand (MOD) application 363, an e-mail application 365, and a web browser application 366. Also included is a PVR application 377. The PVR application 377 provides for content recording functionality by enabling the temporary writing to, and if requested, more permanent recording (i.e., relatively permanent) to the storage device 373. It should be clear to one with ordinary skill in the art that these applications are not limiting and merely serve as examples for embodiments of the invention. Furthermore, one or more DRAM based applications may be resident, as an alternative embodiment, in FLASH memory 351, and vice versa. The FLASH based applications include a bootloader (BL) 360, a WatchTV application 362, a PPV application 364, and an IPG application 397. These applications, and others provided by the subscriber television system operator, are top-level software entities on the network for providing services to the user.

The BL 360 is used to get the DHCT 16 up and running after it has been powered off and then on, for example via a reboot. The BL 360 does a verification of what is in FLASH 351, and checks signatures and other functionality to ensure that software code is running as planned. With DHCT systems working as expected, the BL 360 executes the operating system 353, and the operating system 353 in turn executes the resident application 382. Further information on the BL 360 and start-up processing can be found in the application entitled, SETTOP CABLE TELEVISION CONTROL DEVICE AND METHOD INCLUDING BOOTLOADER SOFTWARE AND CODE VERSION TABLE FOR MAINTAINING AND UPDATING SETTOP RECEIVER OPERATING SYSTEM SOFTWARE, filed Apr. 14, 2001, having Ser. No. 09/549,292, issue as U.S. Pat. No. 7,069,578 assigned to Scientific Atlanta, and herein incorporated by reference.

The proactive reboot system preferably includes a proactive reboot manager (PRM) 388 and an opportunity helper (OH) 389, in accordance with one embodiment of the invention. The PRM 388, as is explained below, detects flags raised by condition monitors in response to conditions indicative of an impending forced reboot. The condition monitors can be located in the operating system 353, the resident application 382, an application, and/or in a downloaded module or modules. Once the PRM 388 detects one or more flags, it communicates with the OH 389 of the resident application 382 to determine when to implement a reboot. In other embodiments, the PRM 388 and the OH 389 can be implemented as combined functionality in the operating system 353 and/or the resident application 382.

Other system memory configurations are possible. In one embodiment, the resident application 382 is not a separate module in FLASH 351. A module is herein understood to include functionality enabled using anywhere from a single line of code to a grouping of code that provides a common purpose. For example, a collection of modules can form other larger entities, such as an operating system or a resident application. A module may exist inherently in the platform 301 (e.g., in ROM or FLASH) and/or may be downloaded. As such, collections of modules, such as applications, may be downloaded or exist inherently in the platform 301. Thus, the operating system 353, the resident application 382, and applications are all considered to be collections of modules (herein, modules), and thus there can be one or more modules within these larger entities (e.g., one or more modules within an application). Modules can be combined and packaged in many variations. For example, an operating system can include functionality of the operating system 353 in addition to functionality of the resident application 382. In other embodiments, an operating system can include functionality of the operating system 353, the resident application 382, and one or more applications shown as external to the operating system 353 and the resident application 382. Further, in such configurations, the proactive reboot system can include the combined functionality of the PRM 388 and the OH 389 in the operating system 353, or as separate but communicable modules in the operating system or as modules split between the operating system 353 and an application. It will be appreciated by those having ordinary skill in the art that other extensions of the functionality of the operating system 353 and the resident application 382 can be employed, while still maintaining the spirit and scope of the preferred embodiments of the invention.

For example, the navigator 355 of the resident application 382 is responsible for the detection of platform significant keypresses, such as a power off button, a guide button, volume up and volume down buttons, a mute button (all not shown), among others. The navigator 355 thus communicates to the operating system 353 (and the OH 389) the status of the DHCT 16 (e.g., powered on or off). In one implementation, a device driver (not shown) informs the operating system 353 when a keypress event has been detected (e.g., via an infrared (IR) remote, IR keyboard, universal serial bus (USB) keyboard, etc.). The operating system 353 then notifies the application with the "front-most" display window of the keypress event. If the application has not registered an interest in that keypress event, it is then passed to the next closest window. Because the window manager 359 allows the resident application 382 to have a window that is logically "front most", but may be invisible, both the operating system 353 and the resident application 382 have knowledge of the keypress event before passing the event along to an application with a window.

An executable program or algorithm corresponding to an operating system (OS) component, or to a client platform component, or to an application, or to respective parts thereof, can reside in and execute out of DRAM 352 and/or FLASH memory 351. Likewise, data input into or output from any executable program can reside in DRAM 352 or FLASH memory 351. Furthermore, an executable program or algorithm corresponding to an operating system component, or to a client platform component, or to an application, or to respective parts thereof, can reside in FLASH memory 351, or in a local storage device (such as storage device 373) externally connected to or integrated into the DHCT 16 and be transferred into DRAM 352 for execution. Likewise, data input for an executable program can reside in FLASH memory 351 or a storage device and be transferred into DRAM 352 for use by an executable program or algorithm. In addition, data output by an executable program can be written into DRAM 352 by an executable program or algorithm and be transferred into FLASH memory 351 or into a storage device. In other embodiments, the executable code is not transferred, but instead, functionality is effected by other mechanisms.

Figure 3C:
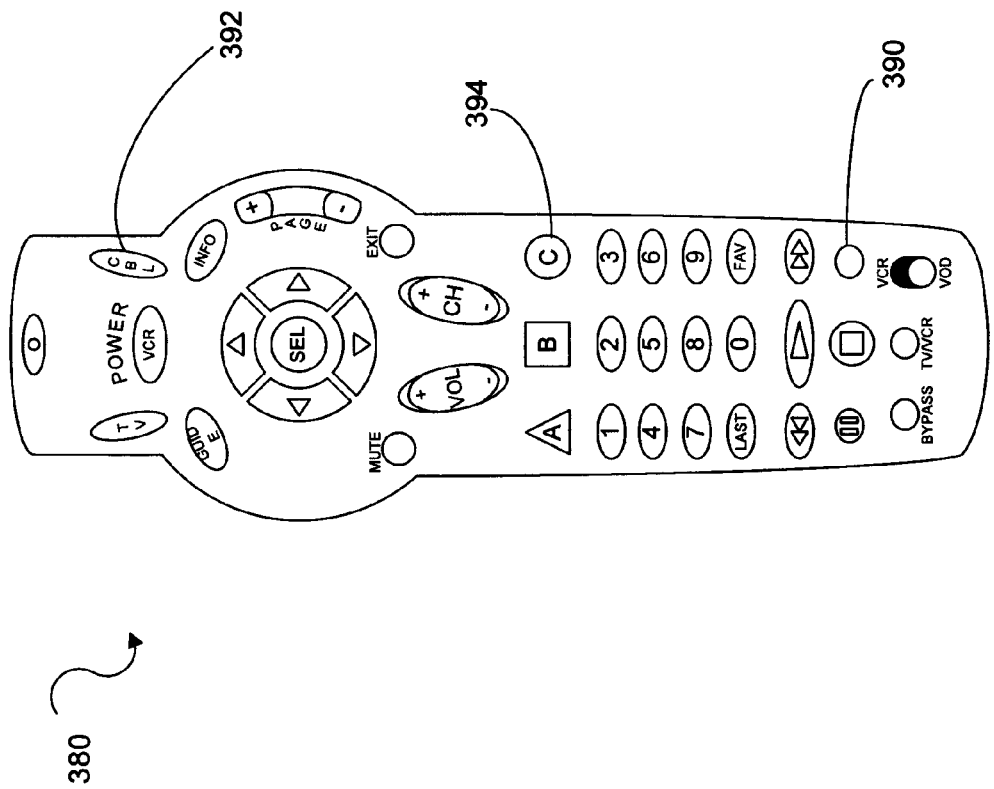
FIG. 3C is a schematic diagram of an example remote control device to provide input to the DHCT of FIG. 3A, in accordance with one embodiment of the invention.

FIG. 3C is an example remote control device 380 used to provide input to the DHCT 16 is illustrated in FIG. 3A. Record button 390 enables the user to designate as permanently recorded any content instance temporarily stored or buffered, or to schedule recordings. The power on/off button 392 is used to power on and/or "soft" power off the DHCT 16 ("soft" power-off includes the DHCT 16 being plugged in, yet powered off). The remote control device 380 also includes lettered buttons, such as the "C" button 394, which are associated with functionality suggested by lettered symbols on a graphics user interface (GUI) screen, as will be shown below. Many alternative methods of providing user input may be used including a remote control device with different buttons and/or button layouts, a keyboard device, a voice activated device, etc. The embodiments of the invention described herein are not limited by the type of device used to provide user input.

Figure 4:
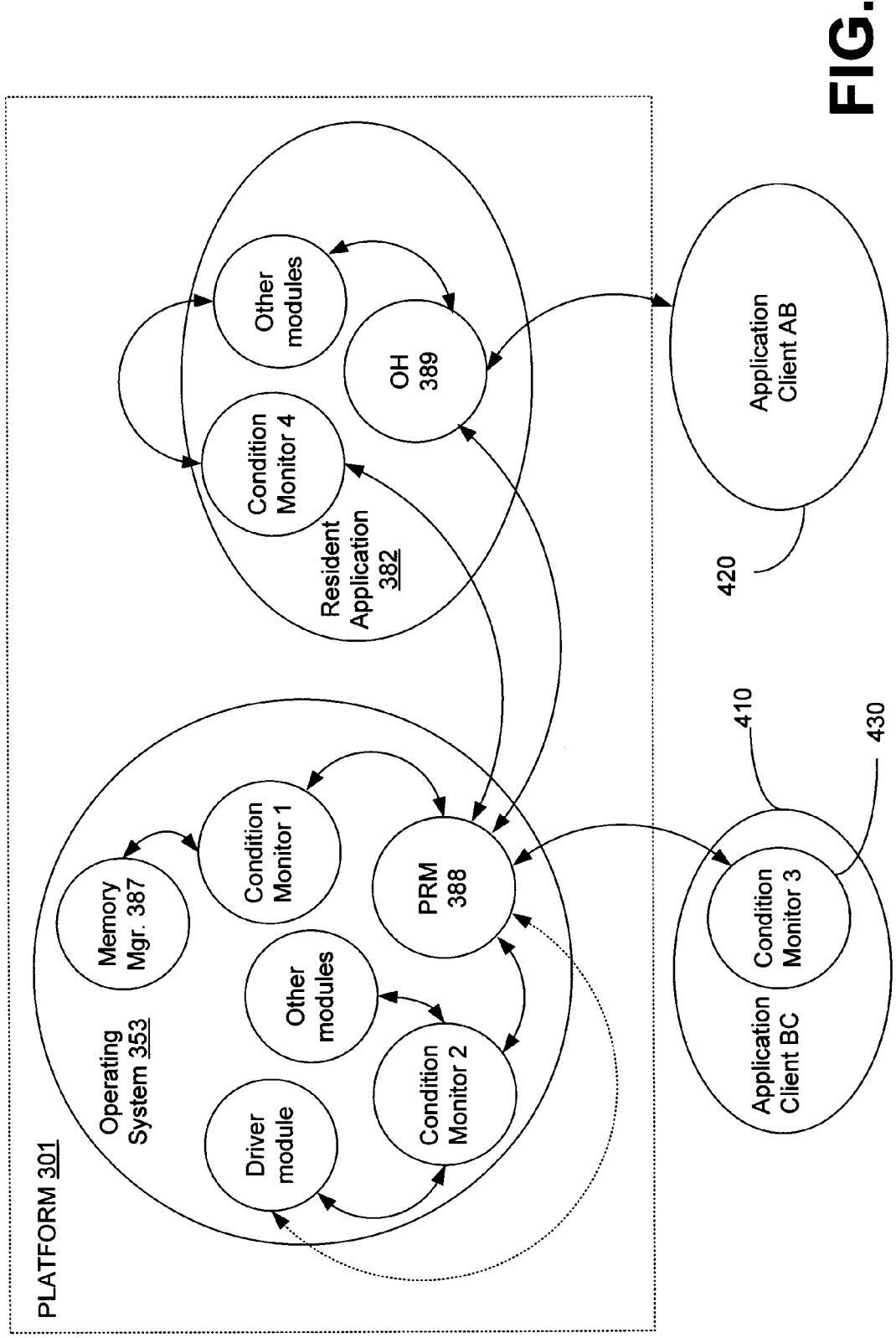
FIG. 4 is a schematic diagram that illustrates some of the interactions of some example components of a proactive reboot system, in accordance with one embodiment of the invention.

FIG. 4 is a schematic diagram that illustrates how the PRM 388, the OH 389, and condition monitors cooperate in the proactive reboot system, in accordance with one embodiment of the invention. Shown is the platform 301 of FIG. 3B comprising the operating system 353 and the resident application 382 and some other example modules. Also shown are some example modules in the form of applications 410 and 420 that are in communication with the PRM 388 and/or the OH 389. As explained briefly above, the PRM 388 of the proactive reboot system can be used in coordination with the OH 389. Preferably, the PRM 388 looks for the presence of flags at condition monitors 430 throughout the system environment of the DHCT 16. The flags are indicators of conditions that are preferably predictive of a critical problem, and thus the conditions create an environment that is favorable for a proactive reboot to avoid later developed critical problems that cause a forced reboot. Each flag preferably has associated with it information identifying the condition, such as an ASCII string, that helps with debugging. For example, the ASCII string might be for a condition such as memory fragmentation that has increased beyond a defined threshold. The ASCII string might include a message such as, "Fragmentation reached 70%."

For diagnostic purposes, this text string can be sent to the headend 11 (FIG. 2) prior to rebooting. In one implementation, the condition monitors can be separate modules, each with monitoring functionality (i.e., monitoring for conditions in the system predictive of critical problems, for example memory fragmentation). Upon detecting a condition that is favorable to a proactive reboot, the condition monitor "raises" a flag. The flag can be a change in bit that is polled (via execution of the PRM 388 on the processor 344) and thus actively detected by the PRM 388, or it can be passively detected by the PRM 388 through a signal or event that is sent directly from a condition monitor to the PRM 388. Furthermore, in addition to software only implementations, the PRM 388 can receive flags through hardware mechanisms such as a bus or other internal electronic communication medium. One skilled in the art will appreciate that there are numerous conditions that can be predictive of later developed critical problems that a pre-emptive (i.e., proactive) reboot can remedy, and thus those listed herein are not meant to be exhaustive, but are examples among many contemplated and considered within the scope of the preferred embodiments of the invention.

The condition monitors can be located in an application 410, the resident application 382, and/or the operating system 353, or in some embodiments, located external to the DHCT 16, such as at the headend 11, as one example. For example, assume an application 410 was just downloaded from the headend 11, and the application 410 has a problem, such as not receiving expected data from the headend 11. The application 410 can be configured to raise its own flag (i.e., have its own functional condition monitor 430) because it has not received any communication from the server at the headend for 3 minutes, despite the fact that it is supposed to receive communication every 30 seconds. Preferably, with its own built-in condition monitor 430, it would raise a flag visible to the PRM 388 along with providing debug information such as an ASCII string. The PRM 388 can then query the OH 389 to determine whether the current time (i.e., at this moment in time that a decision needs to be made) is an opportune time to reboot. The OH 389 preferably queries modules including the resident application 382 or operating system 353, or even applications 420, or modules thereof, to determine if now is an opportune time to reboot, and then the OH 389 replies to the PRM 388 with an answer. In other words, the OH 389 can receive help from other modules that indicate whether a particular instance in time is an opportune time to reboot, and thus in a sense, these modules can be considered "sub-opportunity helpers". Further, one or more condition monitors may remove their flags if the condition that prompted the flag no longer exists, while other condition monitors may not be able to remove their flags.

Figure 5A:
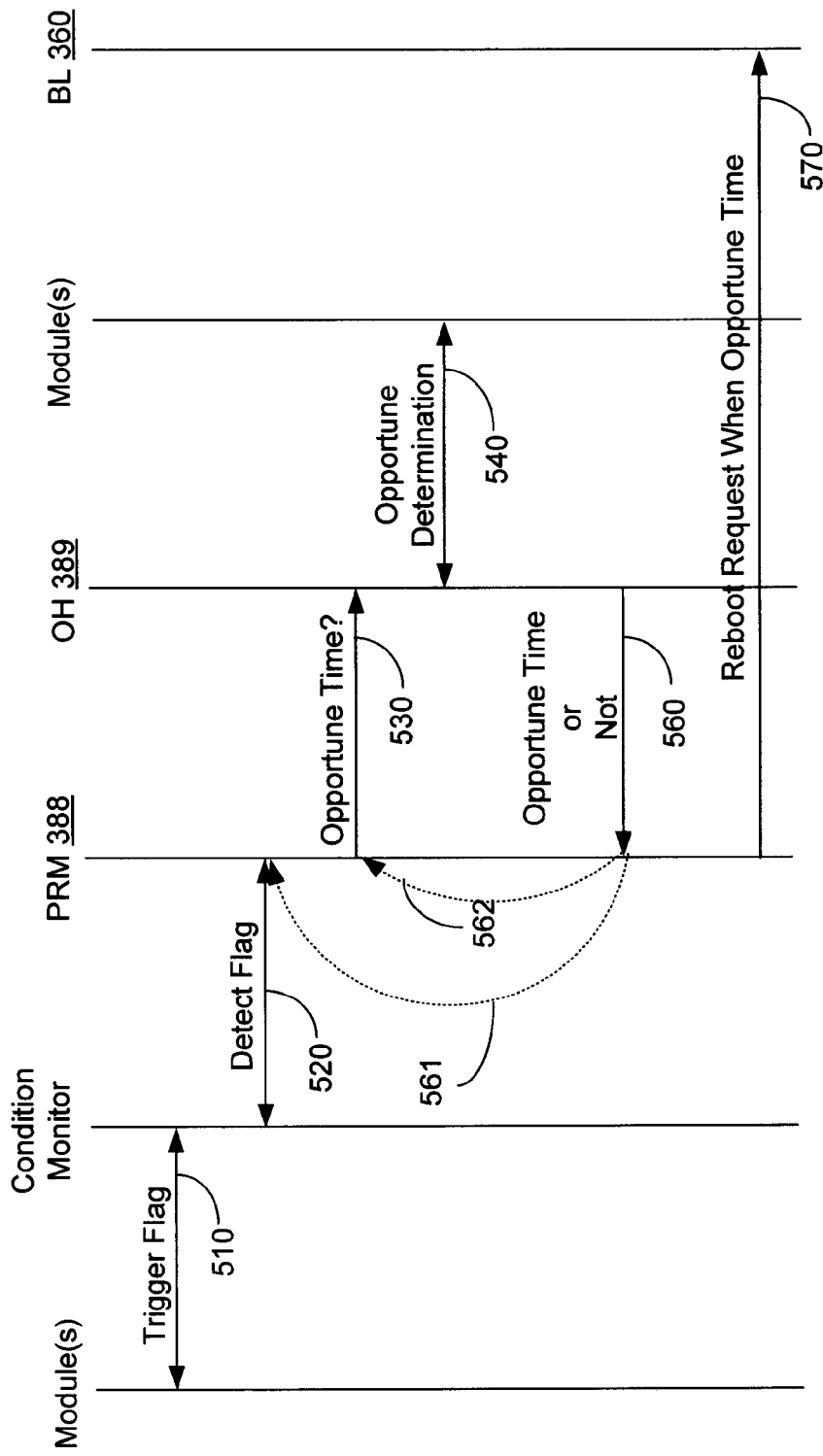
FIG. 5A is a timing diagram that illustrates some of the interactions of some example components of the proactive reboot system, in accordance with one embodiment of the invention.

FIG. 5A is a timing diagram that further illustrates how the PRM 388 cooperates with the OH 389 and condition monitors to both detect conditions leading up to the need for a proactive reboot and provide a reboot at an opportune time, in accordance with one embodiment of the invention. The timing diagram is described in the context of the example system memory configuration described in association with FIG. 3B, with the understanding that other embodiments as described above can apply. Step 510 includes triggering a flag at a condition monitor. As indicated above, the condition monitor can be its own separate module, or one or more modules located in an application, a resident application 382 (FIG. 3B), and/or in the operating system 353 (FIG. 3B). Conditions indicating potential and/or probable critical problems that can benefit from a proactive reboot include memory fragmentation beyond a defined threshold (or fragmentation for a defined threshold of time, such as 70% fragmentation for 30 minutes), not receiving data from the headend 11 (FIG. 2) or from other sources within a defined expectation period, passage of time since the last reboot, and performance degradation beyond a defined performance specification, among others.

For example, the operating system 353 (FIG. 3B) can include a memory manager 387 (FIG. 3B) to keep track of memory allocations for the system. In keeping track of memory allocations, one condition that can be monitored includes memory fragmentation. Memory fragmentation is a function of the percentage of the largest contiguous block of memory over the amount of free memory, or $$1-(\text{largest})/(\text{free}) \qquad (\text{Eq. 1})$$

For example, assume the DHCT 16 includes 8 megabytes (MB) of memory, and 1 MB is free (available), but of that 1 MB of free memory, only 250 kilobytes (kB) are contiguous. Accordingly, there is 75% memory fragmentation. The memory manager 387, or rather, a condition monitor internal to or external to the memory manager 387, can be programmed to flag a condition when the memory fragmentation exceeds a defined threshold, for example 70% fragmentation, since the DHCT 16 (FIG. 3A) may eventually become unstable or unable to execute applications beyond that threshold. Thus, it is a condition that is predictive of a critical problem that, if left unaddressed, may cause a forced reboot later, thus interrupting the viewer while he or she is enjoying a presentation of his or her favorite TV show. The forced reboot can be handled by the operating system 353 or the BL 360 (FIG. 3B), or the application running code at the time of the flag may call on the operating system 353 to reboot.

Another example condition indicative of a potential or probable critical problem can include the failure to receive data at the DHCT 16 when expected. For example, assume the BFS module 343 (FIG. 3B) is supposed to receive an update every 2 minutes, and 10 minutes have elapsed since the last update. A condition monitor in the BFS module 343 (or elsewhere) can track the time that has elapsed since the last update, as well as whether BFS data has been received within the past 10 minutes or some other threshold period of time using operating system time APIs, as one example. If this threshold (e.g., 10 minutes) passes, the condition monitor for the BFS module 343 raises a flag (e.g., a bit change). This flag can be located in one or more memory locations assigned to the BFS module 343 by the compiler or other assigner of memory. Although not a fatal error (i.e., fatal in the sense that leaving it unaddressed may cause a forced reboot), it represents a condition that a reboot may solve. For example, assuming the data has not been received due to a "bug" in the software (e.g., BFS software), rebooting the DHCT 16 (FIG. 3A) will likely place the software into a state where the "bug" does not exist (e.g., the "bug" may not activate until the DHCT 16 has been running for a period of time, say 4 weeks). Thus, detected conditions that prompt a flag may not necessarily cause a forced reboot in the future if the problem is left unaddressed, but may nevertheless prompt a reboot at an opportune time in order to improve DHCT functioning.

Another example condition that could be predictive of a critical problem is the absence of a reboot over an extended period of time. A period of time could be set, say 30 days, beyond which the absence of a reboot would trigger a flag that will consequently result in a later proactive reboot at an opportune time. The operating system 353 (FIG. 3B) preferably keeps track of how long the DHCT 16 has been "alive" since the last reboot, and a condition monitor associated with the operating system 353 can periodically examine this elapsed time and raise a flag if the elapsed time passes the 30 days or some other threshold value.

Performance degradation is another example condition that can be used to trigger a proactive reboot. For example, a condition monitor of the operating system 353 (or located elsewhere) can monitor the central processing unit (CPU) idle thread time, which provides an indication of how much CPU time is being wasted. For example, if idle time over a defined period running the same number of applications is reduced from 50% to 20%, it can be an indication that the DHCT 16 (FIG. 3A) is slowing down (since the same number of applications are consuming more and more time). While not immediately fatal, and the user experience may be only slightly affected, a reboot may remedy this condition as well.

Step 520 includes the PRM 388 detecting the flag or flags at the various condition monitors. As described above, the flags can be located at condition monitors configured as separate modules, and/or as modules integrated into an application, the operating system 353 (FIG. 3B), and/or the resident application 382, or external to the DHCT 16 (FIG. 3A).

Step 530 includes the PRM 388 sending a request to the OH 389 asking whether the current time is an opportune time for a reboot. In general, the PRM 388 communicates to the OH 389 that a flag has been detected, and asks the OH 389 if now is an opportune time for a reboot. In the example system memory configuration illustrated in FIG. 3B, the OH 389 is preferably located in the resident application 382 (FIG. 3B), which through the cooperation of one or more modules (including the use of "sub-opportunity helpers) has insight into all areas of the platform 301. The OH 389 uses the platform resources to determine what is the most opportune time in a given situation to reboot the DHCT 16 (FIG. 3A). Opportune times provide a window of opportunity to initiate the reboot. The opportune time includes a time that a proactive reboot preferably has the least effect on the user experience. In other embodiments, the OH 389 can be a module of the operating system 353 (FIG. 3B), of an application manager (not shown), or functionality of the OH 389 can be integrated into a single module within the PRM 388.

Figure 5B:
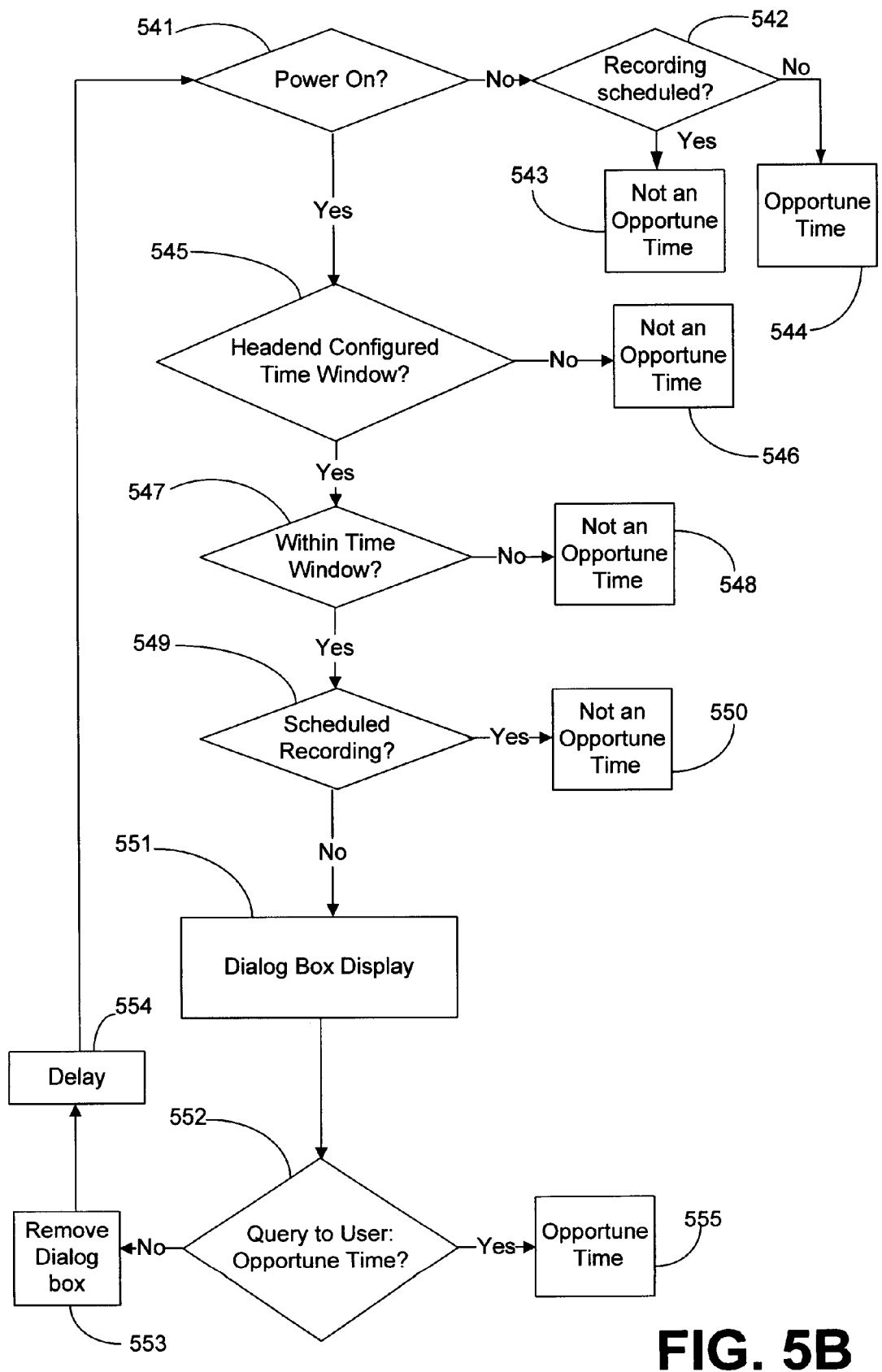
FIG. 5B is a flow diagram of an example decision flowchart that can be implemented by the proactive reboot system to determine an opportune time to reboot the DHCT of FIG. 3A, in accordance with one embodiment of the invention.

Step 540 includes the OH 389 determining whether the current time of the request is an opportune time for a reboot. As shown, this preferably occurs by the OH 389 querying modules internal to and/or external to the platform 301. Although the determination of whether a current time is an opportune time can involve a multitude of "queries", the flow diagram illustrated in FIG. 5B illustrates one example decision flow chart that the OH 389 can implement to determine whether the current time is an opportune time for a reboot, in accordance with one embodiment of the invention. The blocks in the flow diagram of FIG. 5B should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

As will be described below, some times are clearly opportune times, while other times may require user intervention to determine whether the particular instance of time is an opportune time or not. The OH 389 preferably queries other modules internal to and/or external to the DHCT 16 (FIG. 3A) to make a determination as to the existence of an opportune time. In one embodiment, an opportune time can occur either (i) when the DHCT is placed in the soft power-off state (with no recording scheduled) or (ii) when the DHCT is in the powered-on state during a configured time window. A configured time window is supported by the headend 11 to help aid the reboot timing in the power on state. In the power on state, the PRM 388 (FIG. 3B) (through cooperation with the OH 389 (FIG. 3B)) receives no indication whether or not the user is actually watching television. That is, although the soft power off state inherently indicates that the user is not using the DHCT 16 (although a recording may be scheduled), in the power on state, although the user has switched on the DHCT 16, he or she may be performing another task (e.g., out for coffee, driving kids to the movies, etc.). A configured time window reboot can thus affect the user experience.

Step 541 includes determining whether the DHCT 16 (FIG. 3A) is powered on or not. The soft power-off state includes the state of the DHCT 16 when the DHCT 16 is plugged in, yet powered off (as opposed to hard power off wherein the DHCT 16 is unplugged, which essentially disables the DHCT 16). The power state can be monitored by a module that detects and keeps track of keypresses, for example the navigator 355 in the resident application 382.

In one implementation, the OH 389 can interrogate (i.e., actively query) a module of the resident application 382 (FIG. 3B), for example the navigator 355 (FIG. 3B), to determine if the DHCT 16 (FIG. 3A) is currently powered on or soft-powered off. In other embodiments, the OH 389 (FIG. 3B) can passively receive a signal from a module. If the DHCT 16 is in the soft powered off state, the OH 389 determines if a recording was scheduled (step 542), since a recording can be scheduled to occur during the soft power off state, which may conflict with a proactive reboot. If a recording is scheduled, then the OH 389 makes a determination that the current time is not an opportune time for a reboot (step 543). If a recording is not scheduled, the OH 389 makes a determination that the current time is an opportune time for a reboot (step 544). As will be described below, the OH 389 will forward this determination to the PRM 388 (FIG. 3B), which will preferably cause an immediate reboot that will not degrade the user experience. In other implementations, the OH 389 may require a soft power off to have been activated for a duration of more than a defined threshold of time to ensure that the soft powering off action was not inadvertent.

If the DHCT 16 is powered on, step 545 includes determining whether the headend 11 (FIG. 2) has configured a time window for rebooting. Such a time window reboot preferably occurs randomly between a configured start time and an end time. The random nature prevents a large number of DHCTs from rebooting at exactly the same time and stressing the DNCS 223 (FIG. 2). Some guidance for enabling this configured time window reboot is preferably provided by the headend 11 (FIG. 2). Table 1 below is an example table that can be used to configure a proactive reboot. This table can be sent in a file that is downloaded on the network 18 (FIG. 1), thus providing, in one implementation, some control of the reboot process with the operator of the network 18. Explained using a higher level perspective, the table is essentially telling the DHCT 16 (FIG. 3A) to reboot during a particular time of the day, when a flag is raised and detected.

TABLE 1 enable
responseSeconds
windowStartTime
windowEndTime
retryMinutes

Several parameters are shown in the table including enable, responseSeconds, WindowStartTime, WindowEndTime, and retryMinutes. It will be understood that other parameters can be used, or parameters can be omitted from the table or added to the table. The enable parameter states whether the PRM 388 (FIG. 3B) is enabled or disabled. Preferably it will take on either a TRUE or FALSE value. The responseSeconds parameter equates to the number of seconds to wait, after displaying a maintenance warning message (e.g., the dialog box 580 of FIG. 5C, described below), before rebooting the DHCT 16 (FIG. 3A). The windowStartTime parameter includes the earliest time of day when a windowed proactive reboot may occur. The windowEndTime parameter includes the latest time of day when a windowed proactive reboot may occur. The retryMinutes parameter includes the number of minutes the PRM 388 should wait before trying to reboot the DHCT 16 after the previous attempt was postponed by the user. In other words, if an opportune time occurs between now and retryMinutes in the future, the time represented by retryMinutes in the future is when a dialog box is displayed again. During this period before the next display of the dialog box, all or part of the processing of the OH 389 in one implementation (as illustrated by the flow chart of FIG. 5B) can be repeated to "look for" opportune times to reboot. Thus, the condition that prompted the proactive reboot system implementing this decision processing may go away completely, or be replaced (or supplemented) by another condition, within or beyond the configured time window.

While these parameters can be hard coded, they will preferably be placed in an out of band configuration file. The PRM 388 (FIG. 3B), in one implementation, can load this configuration file at boot time to access the parameters. In other embodiments, the PRM 388 may disable proactive reboots if the file does not exist, or the enable parameter is FALSE. In one implementation, this information is passed to the OH 389 to make a determination that the current time is not an opportune time for a reboot (step 546). Another possible implementation would treat the non-existence of the headend configuration data as an indication that all times are valid to proceed to step 549 (see below). The PRM 388 checks periodically (e.g., once per day) to determine whether the configuration has changed. If no configuration file originally existed, the PRM 388 checks for the file preferably every 24 hours after the original attempt. If the configuration file was loaded, the PRM 388 checks for an updated configuration file when windowEndTime is reached. The PRM 388 preferably does not check for an updated configuration file if a reboot is currently delayed because of the user's response.

The configuration file is preferably formatted as ASCII name/value pairs, one per line, in the form, Name=value.

For example, the following shows how to specify the value of retryMinutes:

RetryMinutes=60.

Cable operators are different, as are the viewing patters of users per region. Thus, the operator can configure the parameters of Table 1 using a system-wide perspective down to the level of a specific region or DHCT 16 (FIG. 3A). For example, in some areas of the country, there is a high proportion of shift workers, whom will generally have different viewing patterns than office workers. Thus, such regions may have a different reboot schedule than other regions. Note that DHCT specific reboots can be established via a user configuration screen, for example through a general settings menu screen (not shown), configured at start-up or at other times. Such user settings can be used in cooperation with the parameters of Table 1 as configured by a cable operator, or in other embodiments, separate from these parameters.

Step 547 includes making the determination that the current time is or is not within the time window configured by the headend 11. If not within the configured time window, then the determination is made that it is an inopportune time for a reboot (step 548). If within the configured time window, then step 549 includes determining whether a recording is scheduled. For example, the OH 389 can query an application, such as the PVR application 377 (FIG. 3B), to find out whether a recording is scheduled during the configured time window for the reboot from this point forward. If a recording was scheduled, then rebooting can cause an interruption in the user experience, which results in the OH 389 deciding that the current time is not an opportune time (step 550).

If a recording is not scheduled, step 551 includes providing the user with a dialog box that queries the user as to whether the current time is an opportune time for a reboot (step 552). Other embodiments omit steps 551-553.

FIG. 5C is a screen diagram of an example dialog box 580 used to alert the user to a reboot, and provides the user with an option to postpone the reboot until an opportune time, in accordance with one embodiment of the invention. If the "C" button 394 on the remote control device 380 (FIG. 3C) is pressed, as suggested by the "C" button icon 582, the dialog box 580 is removed (step 553) and the DHCT 16 (FIG. 3A) continues operating as before. The dialog box 580 is rescheduled to appear again after a delay (step 554) of a configurable amount of time (e.g., in a configurable number of minutes) from the current time. In other embodiments, the delay can be a fixed delay programmed into the proactive reboot system. The rescheduled time for display is allowed to occur outside the time window. If the DHCT 16 is soft powered off before the rescheduled time passes, the reboot preferably occurs immediately (i.e., if no recordings are scheduled). If the "C" button 394 is not pressed within a configured (or fixed in other embodiments) number of seconds, it is assumed the user is not watching television and the determination is made that the current time is an opportune time (step 553, FIG. 5B). If the flag is removed (and no flags remain), the reboot is cancelled.

Note that is some embodiments, additional steps can be added, steps can be removed, and/or different steps can be used. For example, a determination of whether an opportune time exists or not can be made based on whether one or more keypresses have been detected (preferably in cooperation with the navigator 355 (FIG. 3B)) over a defined period of time since the last detected keypress. A user may not have pressed a button on the remote control device 380, for example, because he or she is asleep or left the TV on while sleeping. If a keypress was detected within a defined period of time preceding the current time, the OH 389 (FIG. 3B) can make a determination that the current time is not an opportune time. As another example, the determination that the DHCT 16 is in a soft power off state may result in a determination of an opportune time by scheduling the reboot to not interfere with the scheduled recording (e.g., via additional bi-directional communication between the headend 11 and the DHCT 16 to determine the recording schedule). Referring to the timing diagram of FIG. 5A, step 560 includes the OH 389 communicating to the PRM 388 as to whether the current time is an opportune time or not. In some embodiments, the OH 389 can reject the current time as an opportune time, advise the PRM 388 that it will alert the PRM 388 when an opportune time occurs, and cache the request until an opportune time does indeed arise. In such an embodiment, the OH 389 can, in response to determining that an opportune time is now available, send a message to the PRM 388 advising of the existence of an opportune time. If a condition (or conditions) that prompted one or more flags no longer exists (as represented by dotted line 561), the PRM 388 can notify the OH 389 and thus cancel the cached request. In other embodiments, the PRM 388 can, when denied a reboot request, periodically resend the request until an affirmative response is received by the OH 389 (as represented by dotted line 562).

Step 570 includes the PRM 388 instructing the BL 360 (preferably via an API) to reboot the DHCT 16 (FIG. 3A) once an affirmative response (to an inquiry as to whether to proceed with a reboot) is received by the PRM 388 from the OH 389. The BL 360 reboots the DHCT 16, as described above. When that occurs, DRAM is preferably cleared of the applications, the operating system 353 (FIG. 3B) reinitializes itself, and the DHCT 16 re-signs onto the headend 11. This re-signing process includes a client-server process that entails 2-way communication. As described above, although not limited to random types of implementations, the proactive reboot system of the preferred embodiments can cause the DHCT 16 to sign-on with the headend 11 (FIG. 2) at random times to reduce the stress of sign-ons at the headend 11 from a plurality of DHCTs 16.

The PRM 388 and OH 389 and condition monitors can be implemented in hardware, software, firmware, or a combination thereof. In the preferred embodiment(s), the PRM 388 and OH 389 and condition monitors are implemented in software or firmware that is stored in a memory and that is executed by a suitable instruction execution system. If implemented in hardware, as in an alternative embodiment, the PRM 388 and OH 389 and condition monitors may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The PRM 388 and OH 389 and condition monitors, which comprise ordered listings of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred embodiments" are merely possible examples of implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Therefore, having thus described the invention, at least the following is claimed:

1. A method for rebooting a set-top terminal, comprising:
   detecting an indication of a critical condition associated with the set-top terminal;
   determining based on a current status of resources in the set-top terminal if a current time provides an opportunity for a reboot of the set-top terminal in a manner that reduces user intrusiveness wherein determining based on the current status of the resources in the set-top terminal further comprises querying at least one of the resources to determine if the set-top terminal is in a powered-on state;
   querying, in response to determining that the set-top terminal is in the powered-on state, the at least one of the resources to determine if a time window for rebooting has been configured;
   determining whether the current time is within the configured time window;
   querying, in response to determining that the current time is within the configured time window, the at least one of the resources to determine if a recording is scheduled; and
   effecting a rebooting of the set-top terminal if the current time provides the opportunity, otherwise postponing the reboot.

2. The method of claim 1, wherein detecting the indication comprises polling a bit change associated with a module configured to detect the critical condition.

3. The method of claim 1, wherein detecting the indication comprises receiving an indication signal from a module configured to detect the critical condition.

4. The method of claim 1, wherein responsive to determining that the set-top terminal is in soft-power off state, querying the at least one of the resources to determine if the recording is scheduled.

5. The method of claim 4, wherein responsive to determining that the recording is not scheduled, determining that the current time provides the opportunity.

6. The method of claim 4, wherein responsive to determining that the recording is scheduled, determining that the current time does not provide the opportunity.

7. The method of claim 1, wherein querying, in response to determining that the set-top terminal is in the powered-on state, the at least one of the resources to determine if the time window for rebooting has been configured comprises querying the at least one of the resources to determine one of the following: if a headend has configured the time window for rebooting, if a user configuration process has configured the time window for rebooting, and if the headend and the user configuration process have configured the time window for rebooting.

8. The method of claim 7, wherein querying further comprises accessing a configuration file comprising information corresponding to the time window for rebooting.

9. The method of claim 1, wherein responsive to determining that the current time is not within the configured time window, determining that the current time does not provide the opportunity.

10. The method of claim 1, wherein responsive to determining that the recording is scheduled, determining that the current time does not provide the opportunity.

11. The method of claim 1, wherein responsive to determining that the recording is not scheduled, determining that the current time provides the opportunity.

12. The method of claim 1, wherein responsive to determining that the recording is not scheduled, providing a dialog box that enables the user to determine whether the current time provides the opportunity.

13. A set-top terminal comprising:
   a memory with proactive reboot logic; and
   a processor configured with the proactive reboot logic to:
      detect an indication of a critical condition associated with the set-top terminal;
      determine based on a current status of resources in the set-top terminal if a current time provides an opportunity for a reboot of the set-top terminal in a manner that reduces user intrusiveness;
      effect a rebooting of the set-top terminal if the current time provides the opportunity, otherwise postponing the reboot;
      query at least one of the resources to determine if the set-top terminal is in a powered-on state;
      responsive to determining that the set-top terminal is in the powered-on state, query the at least one of the resources to determine if a headend has configured a time window for rebooting, if a user configuration process has configured the time window for rebooting, or if the headend and the user configuration process have configured the time window for rebooting;
      determine whether the current time is within the configured time window;
      responsive to determining that the current time is not within the configured time window, determine that the current time does not provide the opportunity; and
      responsive to determining that the current time is within the configured time window, query the at least one of the resources to determine if a recording is scheduled.

14. The set-top terminal of claim 13, wherein the processor is further configured with the proactive reboot logic to:
   query the at least one of the resources to determine if the set-top terminal is in a soft power-off state;

responsive to determining that the set-top terminal is in the soft-power off state, query the at least one of the resources to determine if the recording is scheduled;

responsive to determining that the recording is not scheduled, determine that the current time provides the opportunity; and responsive to determining that the recording is scheduled, determine that the current time does not provide the opportunity.

15. The set-top terminal of claim 13, wherein the processor is further configured with the proactive reboot logic to:

responsive to determining that the recording is scheduled, determine that the current time does not provide the opportunity; and responsive to determining that the recording is not scheduled, determine that the current time provides the opportunity or provide a dialog box that enables the user to determine whether the current time provides the opportunity.

16. A computer readable storage medium, wherein the medium is one of magnetic, electronic or optical, storing a proactive reboot program, the program including logic for:

detecting an indication of a critical condition associated with a set-top terminal;

determining based on a current status of resources in the set-top terminal if a current time provides an opportunity for a reboot of the set-top terminal in a manner that reduces user intrusiveness wherein determining based on the current status of the resources in the set-top terminal further comprises querying at least one of the resources to determine if the set-top terminal is in a powered-on state;

querying, in response to determining that the set-top terminal is in the powered-on state, the at least one of the resources to determine if a time window for rebooting has been configured:

determining whether the current time is within the configured time window;

querying, in response to determining that the current time is within the configured time window, the at least one of the resources to determine if a recording is scheduled; and effecting a rebooting of the set-top terminal if the current time provides the opportunity, otherwise postponing the reboot.

* * * * *